United States Patent [19]
Mitani, deceased

[11] Patent Number: 5,247,405
[45] Date of Patent: Sep. 21, 1993

[54] VIDEO TAPE RECORDER HAVING TWO VIDEO DECKS ON A SINGLE CHASSIS FOR TRANSDUCING WITH A SINGLE TAPE

[75] Inventor: Kazuo Mitani, deceased, late of Tsuyama, Japan, by Chiharu Mitani, legal representative

[73] Assignee: Funai Electric Company Limited, Osaka, Japan

[21] Appl. No.: 721,812

[22] Filed: Jun. 26, 1991

[30] Foreign Application Priority Data

Sep. 7, 1990 [JP] Japan .............................. 2-94683[U]

[51] Int. Cl.5 ...................... G11B 5/027; G11B 27/36
[52] U.S. Cl. ........................................ 360/84; 360/31
[58] Field of Search ............................ 360/14.1–14.3, 360/31, 84–85

[56] References Cited

U.S. PATENT DOCUMENTS 5,012,355 4/1991 Taga ........................................ 360/84

FOREIGN PATENT DOCUMENTS 2018465 10/1979 United Kingdom ................ 360/14.3

Primary Examiner—A. J. Heinz
Attorney, Agent, or Firm—Harold Gell

[57] ABSTRACT

A video tape recorder comprising two video decks; one assigned to recording video signals and the other assigned to playing them back immediately in order to check if the recording has been made properly to create a means by which viewers never fail to record.

20 Claims, 5 Drawing Sheets

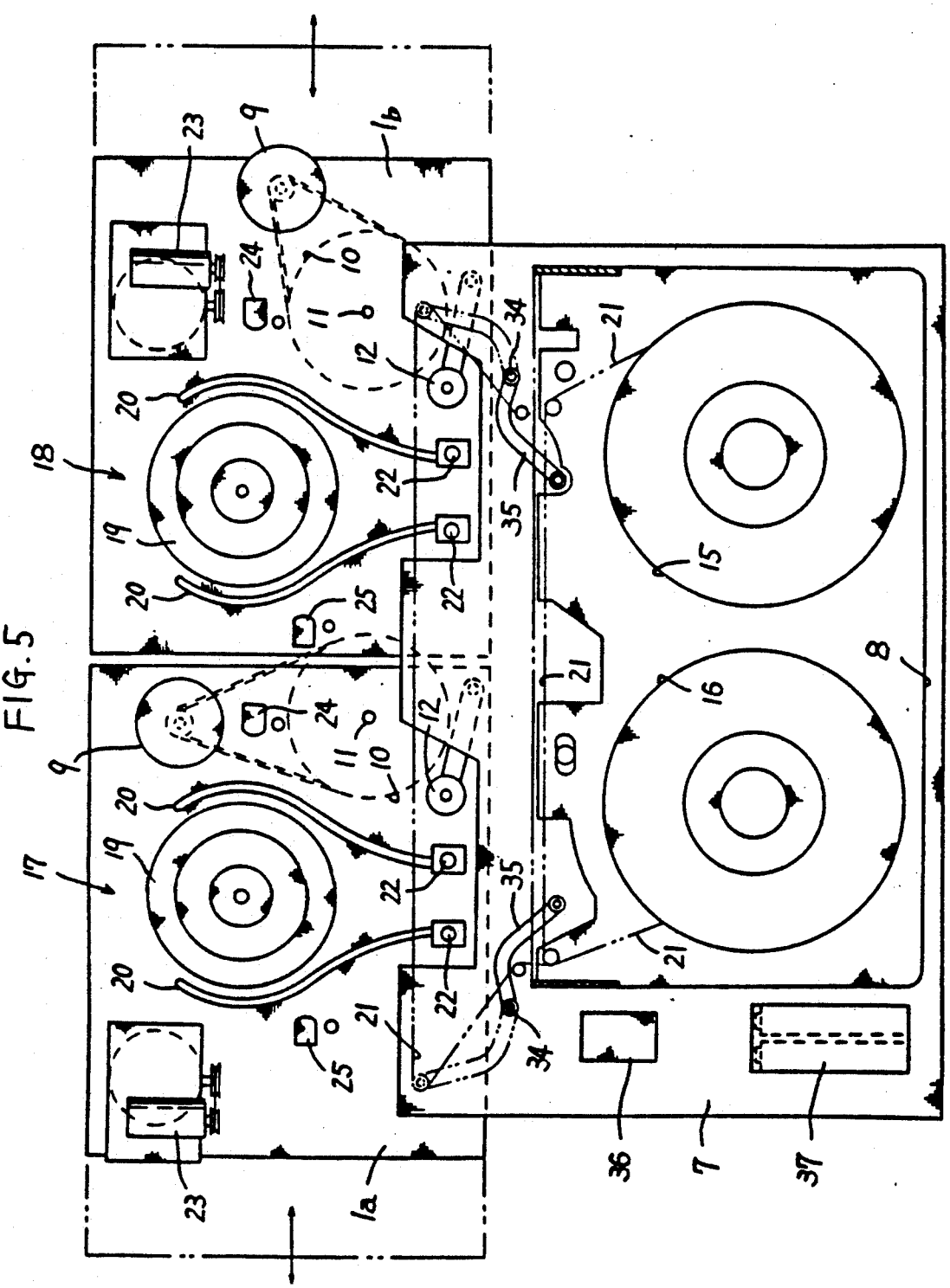

VIDEO TAPE RECORDER HAVING TWO VIDEO DECKS ON A SINGLE CHASSIS FOR TRANSDUCING WITH A SINGLE TAPE

FIELD OF THE INVENTION

This invention relates to a video tape recorder; more specifically, it relates to a video tape recorder which enables viewers to reproduce pictures and sound while they are recording them.

BACKGROUND OF THE INVENTION

So far there has been systems to check if pictures and/or sound to be recorded can be well recorded on a tape. Such systems tells how to record, but do not provide any means to record and check at the same time. Consequently, checking has to follow recording when the recording is finished. On account of that, fail to record was unavoidable.

However, according to the invention, one video tape deck is assigned to recording and another to reproducing a tape, so that viewers can check recorded pictures and sound offhand with the result that they never fail to record them.

DESCRIPTION OF THE DRAWINGS

FIG. 5 is a plan view of another VTR according to the invention.

PREFERRED EMBODIMENT OF THE INVENTION

Figure 1:
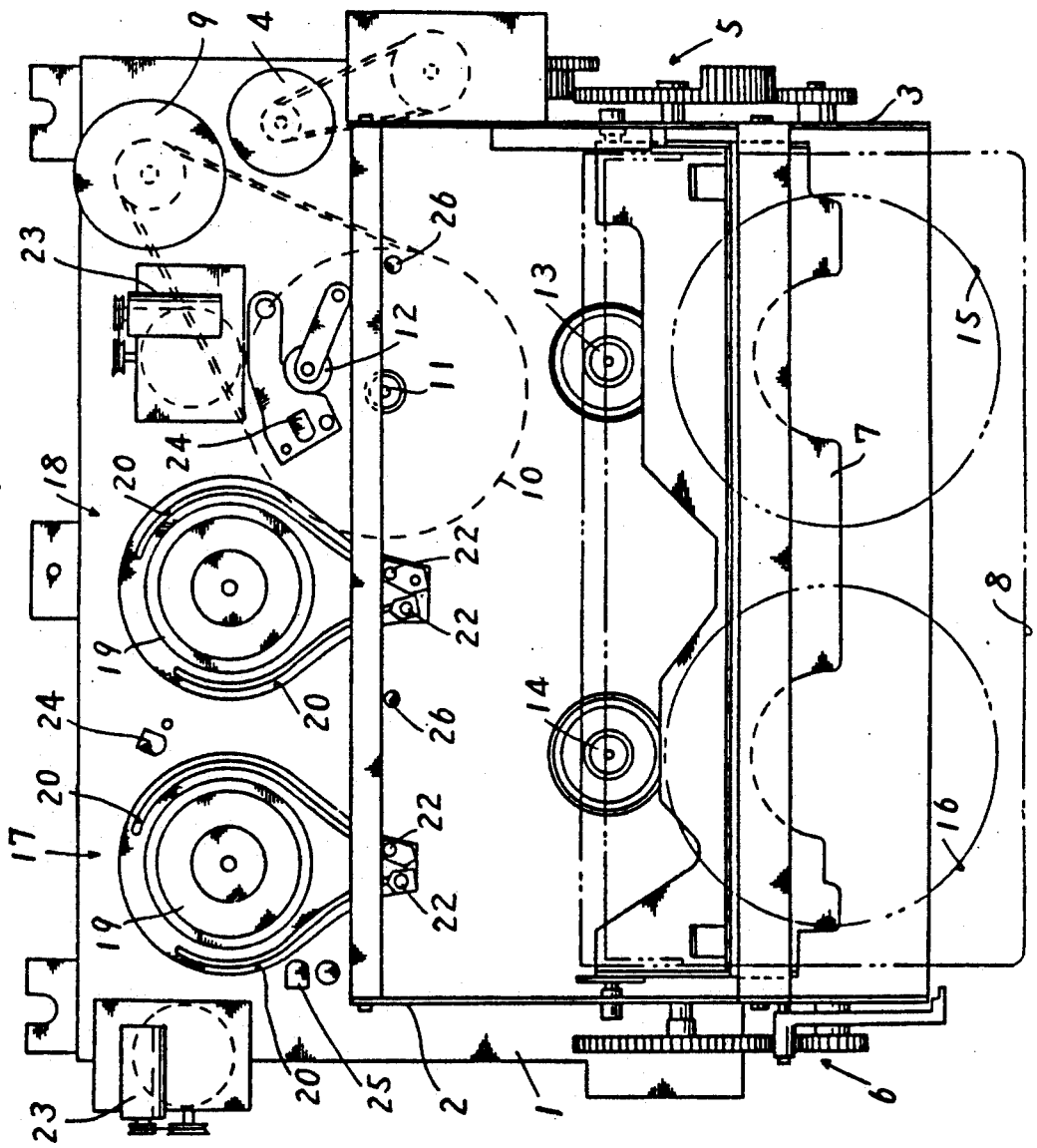
FIGS. 1 and 2 are plan views of a VTR according to the invention.

No references will be made in detail according to the drawing in order that the invention may be understood more clearly.

Figure 2:
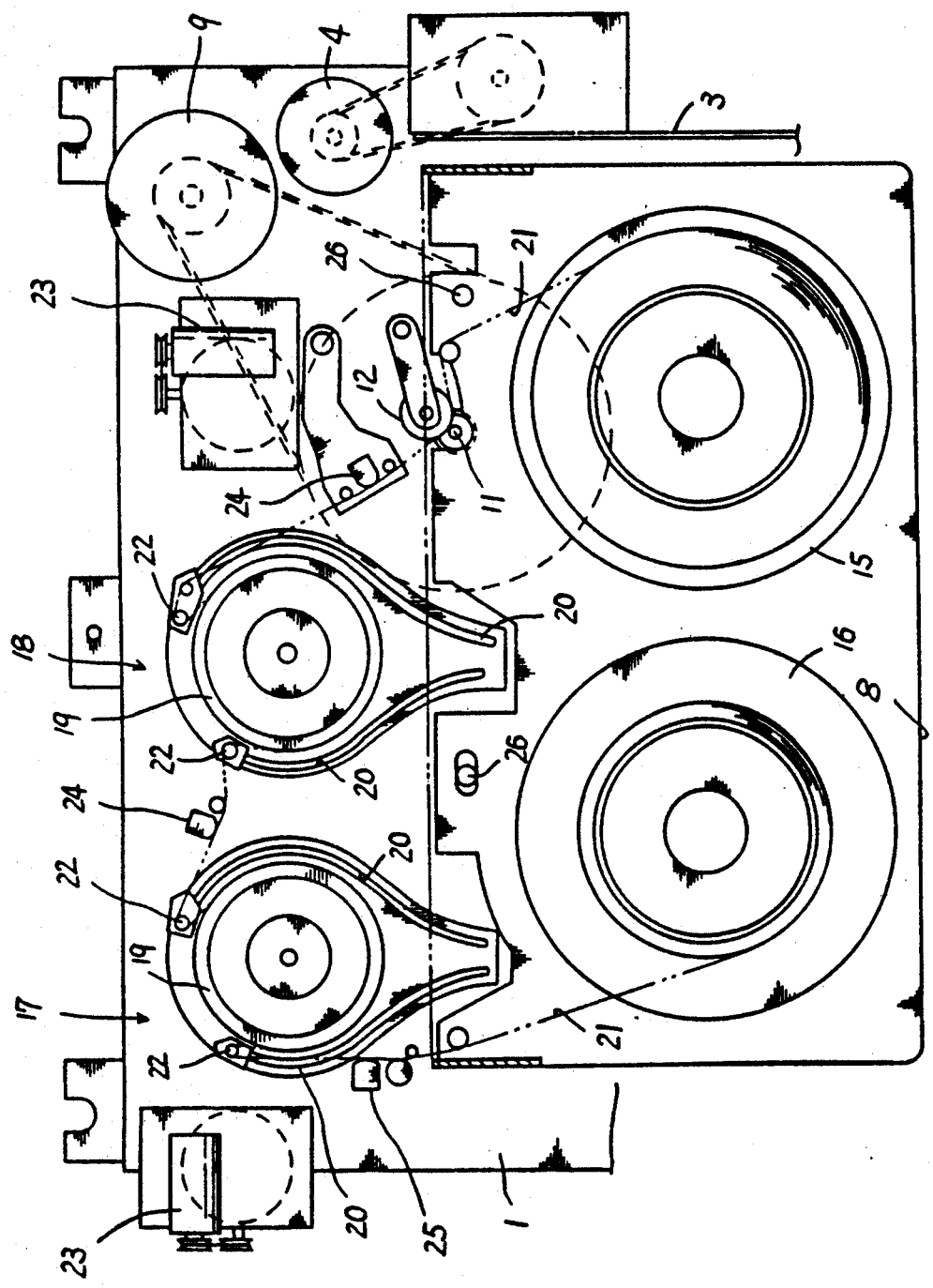

As shown in FIGS. 1 and 2, a pair of plates 2, 3 are provided on the left side and the right side of VTR's chassis respectively. Provided outside the plates 2, 3 are gears 5, 6 for driving a motor 4 for loading or unloading a video cassette tape 8. The plates 2, 3 hold a cassette holder 7 between them which is designed to receive a video cassette tape 8.

A tape driving motor 9, a flywheel 10 driven by the motor 9, a capstan axis 11, a pinch roller 12 which presses on the capstan axis and a pair of reel axes 13, 14 which are coupled to a pair of reels 15, 16 of the cassette 8 respectively are provided on the chassis 1 in order to wind back and forth a video tape on the reels 15, 16. A pair of video decks 17, 18 are disposed side by side on the same plane of the chassis 1. A video read/write head 19, a loading pin 22 for taking video tape 21 out of the cassette 8 before guiding it on a guide rail 20, a tape loading motor 23 for driving the loading pin 22 and an audio read/write head 24 are provided as part of each of the video decks 17, 18. Moreover, an erasing head 25 is provided where a video tape enters the first video deck 17 and adjacent to the capstan axis 11 and the pinch roller 12 of the first video deck.

When the video tape cassette 8 is put on the cassette holder 7, the gears 5, 6 are driven by the cassette loading motor 4. The cassette holder comes close to the top of the chassis. The reels 15, 16 of the video cassette 8 engage with the reel axes 13, 14 respectively and when the position of the cassette 8 is properly settled by a pair of locating pins 26, 26, video tape is forwarded by the loading pins 22, 22 driven by the loading motors 23, 23 and guided on the guide rails 20, 20 from the first to the second video deck. The tape 21 passes through the video heads 19, 19, the audio heads 24, 24 and the erasing head 25 keeping contact with them. Finally, it passes between the capstan axis 11, driven by the motor 9, and the pinch roller 12 and is wound on the reel 15 at a constant rate.

Figure 3:
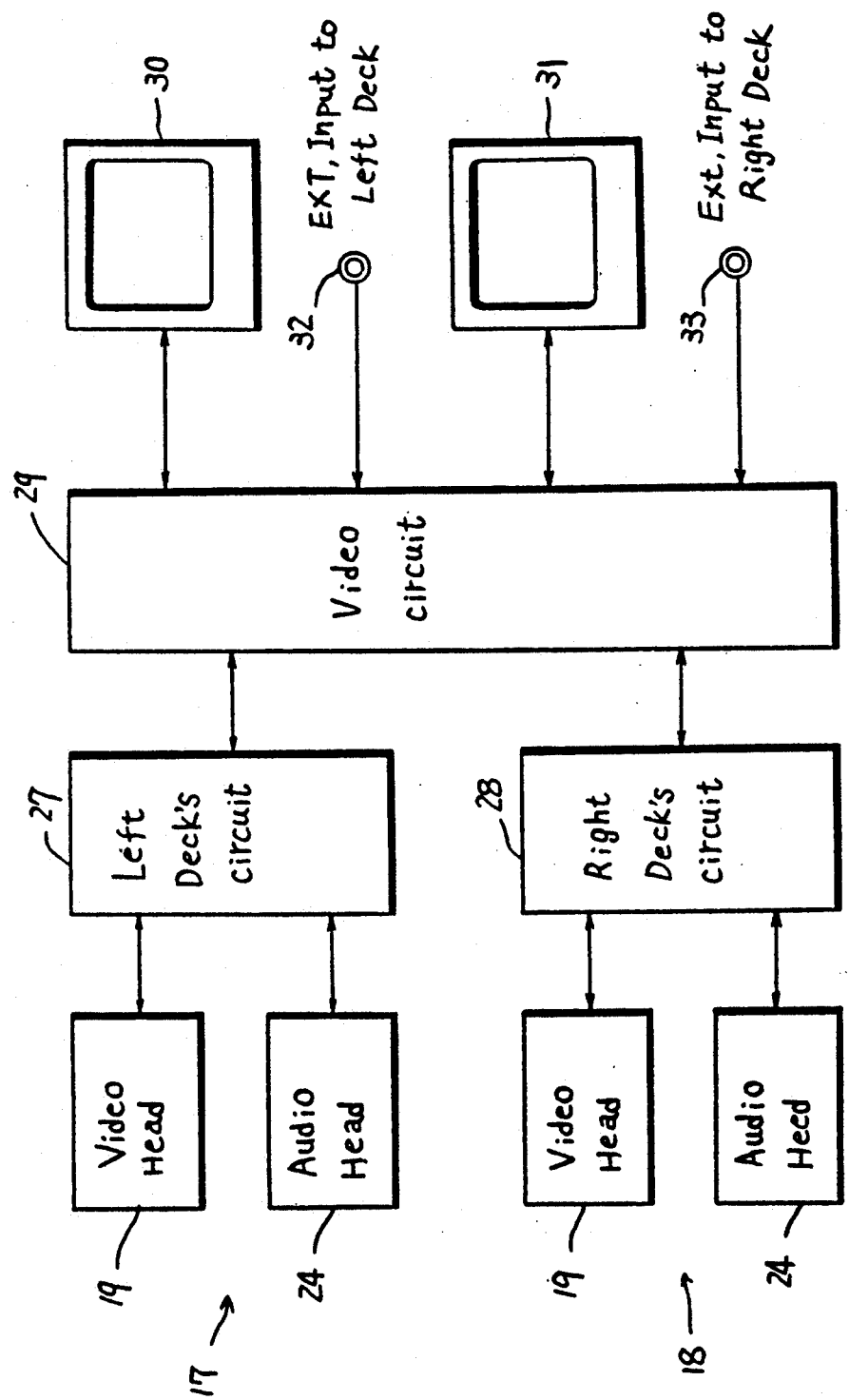
FIG. 3 is a control circuit diagram of the VTR.

As shown in FIG. 3, the first (left) video deck 17 is provided with a circuit 27 to which the video and the audio heads are connected and the second (right) video deck 18 is similarly provided with a circuit 28 to which the video and the audio heads are connected. These circuits 27, 28 are connected to a video circuit 29 comprising a micro-computer. The video circuit 29 is further connected to two television sets 30, 31 and to external input terminals 32, 33 to receive video signals. Thus, video signals can be recorded by either the first 17 or the second deck 18 and the recorded video signals can be displayed by either of the television 30, 31. In this example, the first video deck 17 is assigned to recording and the second video deck 18 is assigned to playing back recorded video signals.

Figure 4:
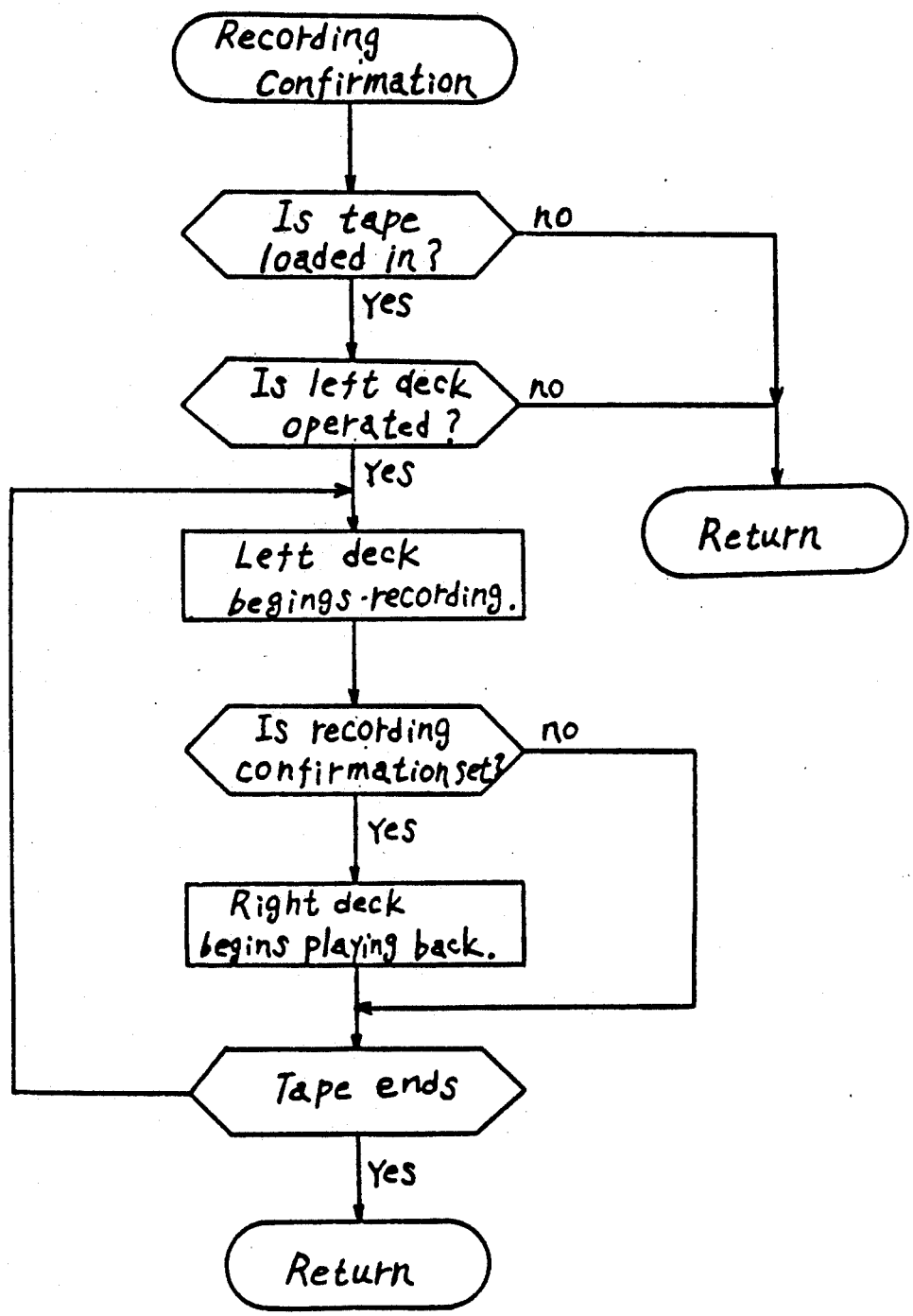
FIG. 4 is a flow chart showing the function of the VTR.

Reference has been made to the structure and the mechanism of an embodiment of the invention. Now reference will be made to the function thereof. As shown in FIG. 4, when it is confirmed that a video cassette tape 8 is set to the proper position, the first video deck 17 begins recording video signals as soon as it is activated and the second video deck 18 simultaneously begins playing back the just recorded signals and displaying them on the television 31 in order that they may be checked if properly recorded on the tape.

As shown in FIG. 5, the deck chassis 1 can be divided into two 1a, 1b; left and right or upper and lower. The tape driving motor 9, the flywheel 10, the capstan axis 11, the pinch roller 12, the video head 19, the guide rails 20, 20, the loading pins 22, 22, the tape loading motor 23, the audio head 24 and the erasing head 25 are provided on each of the decks 1a, 1b.

In this case, a pair of arms 34, 34 for extending video tape 21 are made pivotable around their axes 35, 35, a motor 36 for driving the arms and a battery 37 for energizing the motor 36 are mounted on the cassette holder 7. By means of these devices, a video tape 21 can be thread through the decks 1a, 1b when the reel axes 13, 14 are engaged with the reels 15, 16 and the video tape is extended before the cassette 8 by the arms 35, 35. In this regard, the video decks 1a, 1b can be constructed free from the structure of the cassette 8. Moreover, one cassette 8 can be loaded in each of the video decks 1a, 1b when they are separated. In this embodiment, according to the invention, it is possible to have VTR structure capable of recording and playing back with one video tape or recording and playing back with two video cassette tapes.

What is claimed is:

1. A video tape recorder, comprising:
   first and second video decks;
   said first video deck comprising means for recording a video signal on a magnetic recording media; and
   said second video deck comprising means for simultaneously playing said video signal recorded on said magnetic media for verifying that said recording was made properly.

2. An apparatus for recording on video tape, comprising:
- a first video deck means for recording on said video tape;
- a second video deck means for playing said recording on said video tape;
- said first and second video decks supported on a common chassis; and
- means for guiding said video tape from said first video deck to said second video deck for sequentially performing simultaneous write and read functions on said tape.

3. An apparatus as defined in claim 2 wherein said first video deck includes a write head and said second video deck includes a read head.

4. An apparatus as defined in claim 2, comprising:
- a tape drive motor for driving said tape sequentially through said first and second video decks.

5. An apparatus as defined in claim 2, wherein said video tape is supplied by a single cassette.

6. An apparatus as defined in claim 2, wherein said first and second video decks each include an independent video and an independent audio read/write head.

7. An apparatus as defined in claim 6, wherein said first video deck includes an erase head.

8. An apparatus as defined in claim 7, comprising:
- means for loading a video tape cassette, including means for pulling tape from said cassette and threading it past each of said heads.

9. An apparatus as defined in claim 2, comprising:
- means for loading a video tape cassette, including means for pulling tape from said cassette and threading it through said first and second video tape decks.

10. An apparatus as defined in claim 2, comprising:
- means for loading a video tape cassette, including means for pulling tape from said cassette and threading it through said first and second video tape decks;
- a tape drive motor for driving said tape sequentially through said first and second video decks;
- a first video read/write head incorporated into said first video tape deck;
- a first audio read/write head incorporated into said first video tape deck;
- an erase head incorporated into said first video tape deck;
- a second erase head incorporated into said second video tape deck;
- a second video read/write head incorporated into said second video tape deck;
- a second audio read/write head incorporated into said second video tape deck;

11. A video tape recorder, comprising:
- a first video deck means for recording on video tape;
- a second video deck means for playing said recording on said video tape;
- means for loading a video tape cassette into said video tape recorder, including means for pulling said video tape from said cassette and threading it through each of said video decks; and
- means for guiding said video tape from said first video deck to said second video deck for sequentially performing simultaneous write and read function on said tape.

12. An apparatus as defined in claim 11 wherein said first video deck includes a write head and said second video deck includes a read head.

13. An apparatus as defined in claim 11, comprising:
- a first tape drive motor for driving said tape through said first video deck; and
- a second tape drive motor for driving said tape sequentially through said second video deck.

14. An apparatus as defined in claim 13, wherein said first and second video decks each include an independent video and an independent audio read/write head.

15. An apparatus as defined in claim 14, wherein said first and second video decks each include an independent erase head.

16. An apparatus as defined in claim 15 wherein each of said video tape decks are mounted on an independent chassis.

17. A video tape recorder, comprising:
- a first video recorder subassembly including a video head, an audio head, an erase head and a tape drive motor;
- a second video recorder subassembly including a video head, an audio head, an erase head and a tape drive motor;
- means for loading a video tape cassette into said video tape recorder, including means for pulling video tape from said cassette and threading it through each of said video recorder subassemblies; and
- means for guiding said video tape sequentially past said first video subassembly erase head, to said first video subassembly video head, to said first video subassembly audio head, to said second video subassembly erase head, to said second video subassembly video head, to said second video subassembly audio head for sequentially performing simultaneous write and read functions on said tape.

18. A method for simultaneously recording and reading a common video tape, including the steps of:
- transporting said video tape past a video recording head incorporated in a first tape deck while recording a video signal on said video tape with said recording head; and
- transporting said video tape past a video read head incorporated in a second tape deck while reading the portion of said video tape adjacent said read head simultaneously with said recording of video signals by said recording head.

19. A method for simultaneously recording and reading a common video tape as defined in claim 18, including the further steps of:
- inducing an audio signal in said video tape down stream of said video recording head concurrently with the recording of said video signal; and
- reading an audio signal down stream of said video read head concurrently with the reading of said video signal.

20. A method for simultaneously recording and reading a common video tape as defined in claim 19, including the initial steps of:
- loading a video tape cassette into the recording device;
- pulling video tape from said cassette;
- threading said video tape in recording conjunction to said video recording head;
- threading said video tape in recording conjunction to an audio recording head;
- threading said video tape in reading conjunction with said video read head; and
- threading said video tape in reading conjunction to an audio read head.

* * * * *